(12) United States Patent
Mittal et al.

(10) Patent No.: US 7,757,117 B2
(45) Date of Patent: Jul. 13, 2010

(54) METHOD AND APPARATUS FOR TESTING OF ENTERPRISE SYSTEMS

(75) Inventors: Avinash C Mittal, Gurgaon (IN); Patrick Joseph O'Sullivan, Ballsbridge (IE); Sachin K Jain, Ardee (IN)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 11/736,377

(22) Filed: Apr. 17, 2007

(65) Prior Publication Data
US 2008/0263410 A1  Oct. 23, 2008

(51) Int. Cl.
*G06F 11/00* (2006.01)
(52) U.S. Cl. .................. 714/15; 714/32; 702/182
(58) Field of Classification Search .......... None
See application file for complete search history.

(56) References Cited

U.S. PATENT DOCUMENTS

| | | | |
|---|---|---|---|
| 5,956,662 A * | 9/1999 | Hemker et al. | 702/182 |
| 6,266,781 B1 * | 7/2001 | Chung et al. | 714/4 |
| 6,792,393 B1 * | 9/2004 | Farel et al. | 702/186 |
| 6,823,380 B1 * | 11/2004 | Nace et al. | 709/224 |
| 2002/0161553 A1 * | 10/2002 | Har'El et al. | 702/186 |
| 2002/0177977 A1 * | 11/2002 | Scarlat et al. | 702/186 |
| 2005/0216234 A1 * | 9/2005 | Glas et al. | 702/186 |
| 2006/0195725 A1 * | 8/2006 | Shah et al. | 714/38 |
| 2007/0288625 A1 * | 12/2007 | Chakra et al. | 709/224 |

OTHER PUBLICATIONS

Mosberger et al, "httperf—A Tool for Measuring Web Server Performance", 1998, ACM SIGMETRICS Performance Evaluation Review archive vol. 26 , Issue 3 (Dec. 1998), pp. 31-37.*
Ludlow, D., "Load Balancing Benchtest-Website Safety Nets," *Network News*, pp. 22-25 (Sep. 2001).

* cited by examiner

*Primary Examiner*—Gabriel L Chu
(74) *Attorney, Agent, or Firm*—Hamilton, Brook, Smith & Reynolds, PC (57) ABSTRACT

In a method of virtual user compensation by a test run system of an enterprise system, the termination of a virtual user is identified and a new virtual user is created to compensate for the terminated virtual user. The new virtual user is then assigned to the enterprise system. Rules associated with the conditions of virtual user termination indicate how to compensate for the terminated virtual users.

23 Claims, 5 Drawing Sheets

| Failure # | User # | Termination details ||| Statistics data | Compensation details ||||
|---|---|---|---|---|---|---|---|---|---|
| | | Reason | Time | Action | | Rule # | User # | Action | Other |
| 1 | 85 | Instant messaging server failure | 11/29/03 10:05 | Instant messaging | | 5 | 501 | Mail | |
| .. | .. | .. | .. | .. | .. | .. | .. | .. | .. |
| n | 7 | Instant messaging server failure | 11/29/06 13:53 | Instant messaging | I.M. server failure 50% | 9 | 601 .. 663 | Mail Calendar | Terminate remaining I.M. users |
| .. | .. | .. | .. | .. | .. | .. | .. | .. | .. |
| x | 33 | No response | 11/29/06 15:15 | Mail | | 21 | - | - | Terminate test run |
| | | | | | | | | | |

Fig. 4(a)

| Sub-system | Operational profile | # of failures | % of failures |
|---|---|---|---|
| Mail | 60 | 1 | 0.33 |
| Instant Messaging | 25 | 63 | 50 |
| Calendar | 15 | 0 | 0 |

Fig. 4(b)

METHOD AND APPARATUS FOR TESTING OF ENTERPRISE SYSTEMS

FIELD OF THE INVENTION

The present invention relates to a method, apparatus, and a computer program product for compensating virtual users when executing a performance and a reliability test for an enterprise system.

BACKGROUND

Performance and reliability testing is a fundamental part of an enterprise system development Measurements related to scalability, response times, availability, capacity, achievable transaction-per-second rates, etc represent some of the key areas assessed in system test and performance engineering. In performance or reliability test runs, a key objective is to monitor the system under load, where the load is applied based on a large number of virtual users who exploit an operational profile and subject the system under test to load at a constant transaction per second rate (TPS).

Conventional performance and reliability tools (like Mercury LoadRunner™, Rational Robot™, Rational Performance Test™ etc.) provide the capability to load a system under test with a number of virtual users, where each of the virtual users exploits an operational profile. In enterprise load testing using the conventional performance and reliability tools, the number of virtual user can be as low as 500, or as high as several million users.

During the execution of performance and reliability test runs, situations often times occur where the virtual users fail/drop/terminate abruptly (abnormally). These situations could occur for a number of reasons such as subsystem failures, functional issues resulting in complete destruction of the virtual user's session, and so forth.

Assessment of system availability is another fundamental parameter in performance and reliability testing. System availability is generally given as a measurement of active users over a sustained time. Generally, system stability is assessed by executing a 7-day test run as a solid baseline. However, it is not uncommon for systems to remain under a constant load test for several weeks. It is desirable in measuring aspects of system availability that the number of users during the test run remains constant. In other words, it is desirable that the load (expressed as TPS) is sustained for the duration of the test run. In conventional test ran systems, when the virtual users fail (due to failures related to one of the enterprise system's components), the TPS drops and the constant TPS that was decided at the outset of the test run is no longer maintained. As the overall TPS rate is derived from the aggregation of all users on the system, TPS rates drops down if the number of users m the run is reduced. This creates a number of disadvantages for the test runs.

For example, a scenario where the test analyst sets up the test run on a Friday, monitor the initial phases of the test run during the day to ensure that all is well with the target TPS sustained, and allow the test run to continue over the weekend before returning, after a period of time, on Monday to take stock of the current situation. In the event some of the virtual users are abruptly terminated during the test run due to some reason or another, the effective number of active virtual users is less than the targeted number and hence the TPS targets are not met. In such situations conventional tools do not have the capability to compensate for the terminated virtual user in order to maintain the number of active virtual users and hence maintain the TPS load constant throughout the test run.

If 50% of the virtual users have been terminated, then the TPS will have effectively been halved. While the failures associated with the terminated (virtual) users has great value to testers, a fundamental disadvantage is the absence of answers to the questions on "how would the system have behaved if the constant TPS rate decided at the outset was sustained" or "would the system have remained available at the 72nd hour". Consequently, methods performed by conventional tools forces the test analyst to analyse the cause of abrupt termination of virtual users, clean the system and bring the system to the base state, and then re-run the system. This means that the test analyst has to administer multiple runs by incrementally resolving the cause of abrupt user terminations. A disadvantage is the delays associated with the test analyst in understanding and assessing the system availability concerns, and the multiple incremental runs also leading additional effort and time consumption, thereby leading to slippage in project schedules. A further disadvantage is that architectural changes may be necessary to achieve enterprise capacity numbers resulting in additional cost. A further disadvantage in the existing tools is that several runs are required along with incremental debugging related to abnormal terminations before one can get to flushing out the high availability issues. Yet a further disadvantage is that significant time and knowledge is lost during performance and reliability runs because of this shortfall.

SUMMARY

Therefore, it is an object to ameliorate one or more of the above mentioned disadvantages by providing an improved system (apparatus) and method for compensating virtual users in a test run, for simultaneously maintaining a constant TPS and providing relatively high availability. There also exists a need for decision logic to decide where (and where not) to target the new virtual users for compensation. An advantage is that if the system availability against constant load can be assessed earlier in the enterprise system development, and not towards the end, then substantial cost savings can be realized, especially those associated with late architectural changes.

Disclosed is a method and a computer program product for a method of virtual user compensation by a test run system of an enterprise system. The termination of a virtual user is identified and a new virtual user is created to compensate for the terminated virtual user. The new virtual user is subsequently assigned to the enterprise system.

According to a further aspect of the invention disclosed is a test controller apparatus capable of compensating virtual users for a performance and reliability test run of an enterprise system. The test controller apparatus has a storage device for storing rules, preferably the rules being pre-defined, for virtual user compensation specifying compensation policies corresponding to conditions of terminations associated with the virtual users. The test controller apparatus also has a processor configured for identifying virtual user termination for one of the virtual users and compensating the terminated virtual user with a new virtual user according to one of the rules stored in the storage device matching a condition of the virtual user termination.

Other aspects of the invention also are disclosed.

BRIEF DESCRIPTION OF THE DRAWINGS

Embodiments of the present invention will now be described with reference to the drawings, in which.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Overview

If a particular component in an enterprise system is malfunctioning, then application of a further load to the malfunctioning component will not contribute to obtaining meaningful performance test result. An advantage of maintaining a constant TPS on the system targeted at other part of the system is that concerns associated with availability can be understood and addressed in other normally functioning sub-system components functioning normally. For example, a load balancer, a dispatcher, a LDAP server or a HTTP server represents individual sub-systems of the enterprise system under test (e.g. Lotus Workplace™ might be the enterprise system under test). If one workplace component (e.g. web conferencing) fails, then compensating the virtual users that are targeted at that component elsewhere (e.g. messaging, learning, etc) means that an assessment of the other subsystems (e.g. dispatcher, load balancer, etc) under constant load can continue.

Likewise, in a multi-layered enterprise system stack, the component at the top of the stack might fail, but other components exercising the same underlying part of the stack may be operative. By applying a constant load to the enterprise system as a whole, availability concerns can be understood and addressed in relation to the enterprise system as a whole and also for the still operative components in the underlying part of the stack.

Even when one component in an enterprise system under a test run fails, if the total user load is maintained by substituting the virtual users formerly targeted to the tailed sub-system with other replacement virtual users targeted at other components of the same enterprise system, then the availability of the enterprise system as a whole, and particularly in relation to the components which are functioning, can still be assessed effectively. In particular, those components for which the system availability can be effectively assessed, the assessment result with user compensation can be used as a valuable data for further development of the system. An advantage is that the system availability assessment obtained through the present invention early on in the development could significantly reduce the total time for developing enterprise systems.

When addressing the system availability issue, the total TPS defines the load which the enterprise application under test can sustain without a failure. It is important to understand whether the enterprise system can sustain the total targeted TPS irrespective of the load on the different components of the application under test. In the event a component fails, compensating the virtual users to another active component facilitates in maintaining the total TPS. Therefore, the availability of the system running at the application servers can be addressed. In the event one or more component fails while other components being still active, it becomes essential to understand the availability with respect to the other active components under increased TPS, which effectively results in the same total TPS for the application.

Computing System

A computer platform embodiment for the present invention will be described referring to FIGS. 1 and 2.

Figure 1:
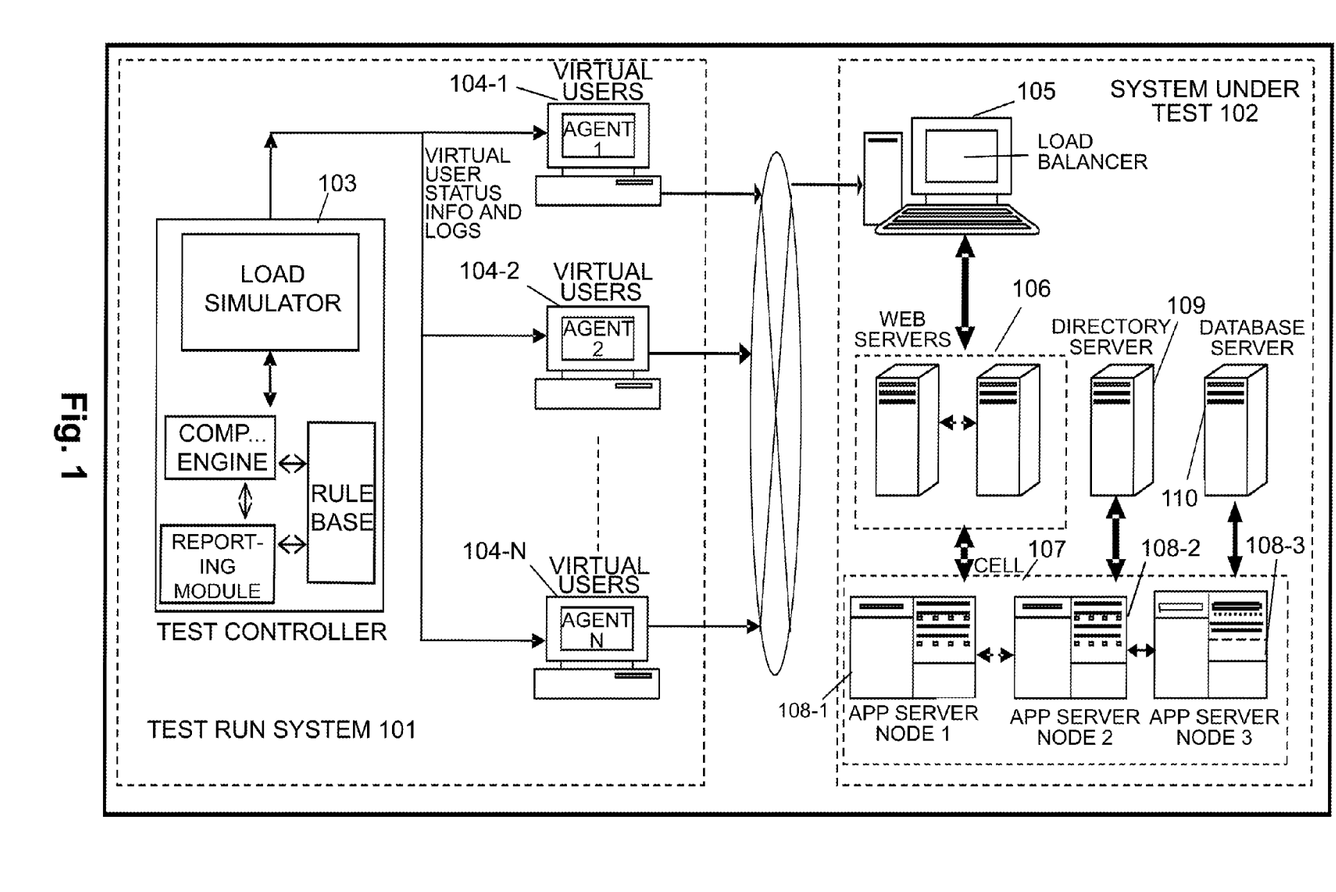
FIG. 1 shows a conceptual block diagram of a test run system and a system under test on which the present invention can be implemented.

FIG. 1 shows a conceptual block diagram of a test run system 101 and a system under test 102 on which this invention may be implemented.

The test run system 101 represents the test environment with a test controller 103 and test agents 104-1 to 104-N. The test agents are simple programs which are executed on remote computer machines, and have the ability of simulating one or more virtual users. Virtual users are logical software simulation of a real time user and are targeted at one of the components of the enterprise system (system under test 102). The following components are provided in the test controller 103 in addition to conventional components:

a) A compensations engine
b) A rule base
c) A reporting module

The test controller 103 is coupled to the test agents 104-1 to 104-N via a network, preferably the Intranet. The virtual suite defining the operations to be executed is propagated to the various test agents 104-1 to 104-N via network links. The test agents 104-1 to 104-N are configured to execute user actions on the system under test 102. Alternatively, one or more of these test agents can be executed on a test controller 103.

The system under test 102 is the enterprise system application being tested. An example of the enterprise system being tested contains various components such as load balancer 105, which distributes the virtual user load among the available web servers 106. The web servers 106 are responsible for generating http requests and responses for the application servers 108-1, 108-2 and 108-3, for example, a mail server, instant messaging server and/or a calendar server etc. These application servers 108-1 to 108-3 are the components where the actual application program is executed. These application servers 108-1 to 108-3 are further clustered together as a cell (unit or group) 107, the cell 107 being a logical grouping of one or more application servers, providing a relatively high availability application server environment. The LDAP (Lightweight Directory Access Protocol) server 109 provides the general directory services for the users and policy management, for example managing user privileges etc. The database server 110 is a generic RDBMS (Relational Database Management System) system hosting the schema management and other data related services. The sub-systems and components 105 to 110 are connected to each other via intra-network and their interactions are governed more or less by the overall architecture as designed for the enterprise system under test 102.

The components such as web conferencing, calendaring, messaging etc. are a part of the enterprise application under test and reside in the application servers 108-1 to 108-3. These components interact with other sub-systems as well, such as web servers 106, directory servers 109, database server 110 etc., of the enterprise application under test. The virtual user compensation is targeted for components like web conferencing, messaging, calendaring etc., and not to the sub-systems like web servers 106, directory server 109, database servers 110 etc.

Figure 2:
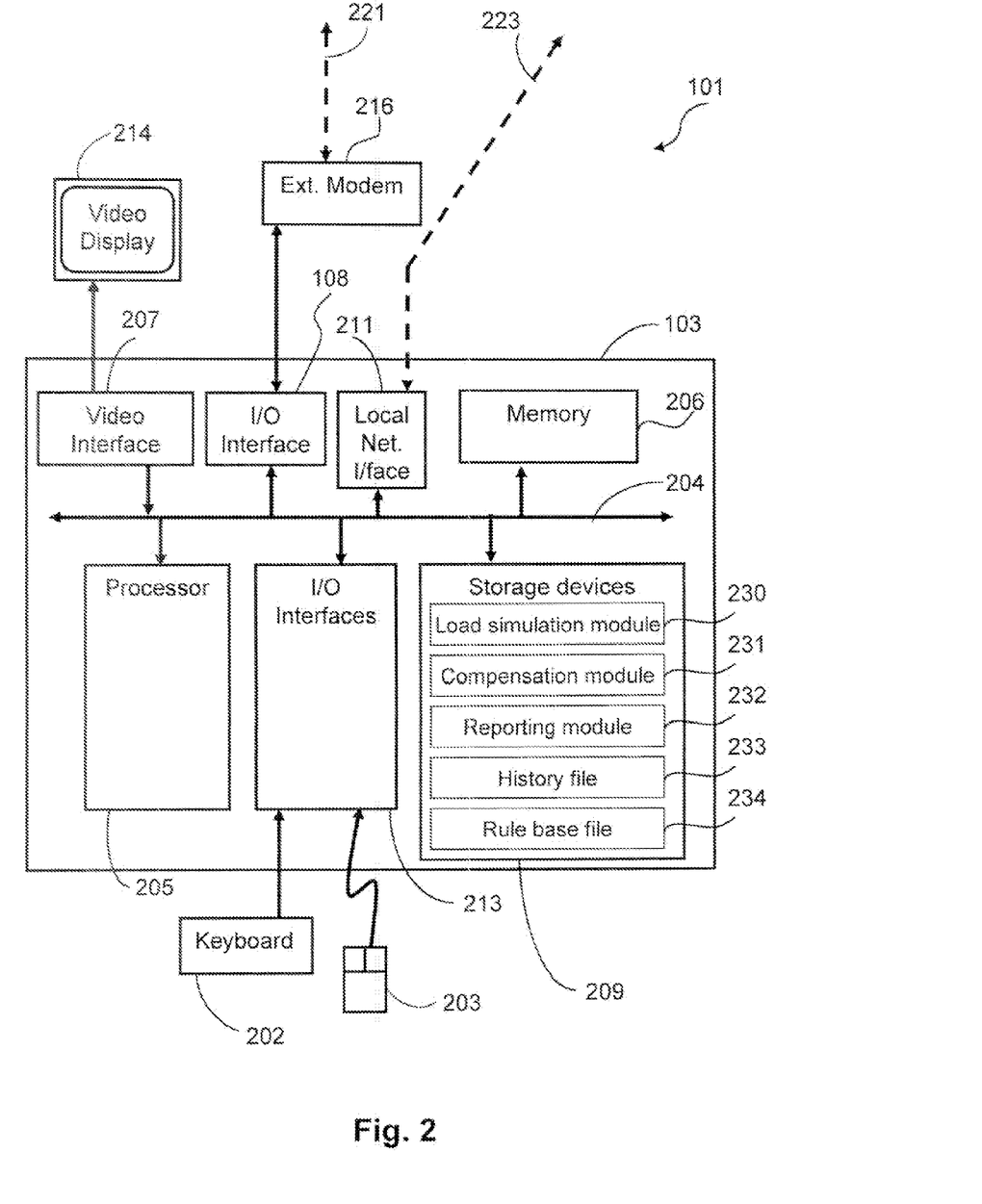
FIG. 2 is a more detailed block diagram of the computer module according to the present disclosure.

FIG. 2 illustrates an exemplary embodiment of the test controller 103 of FIG. 1 where the test controller 103 and the computer modules hosting the virtual users 104 are separate hardware elements in the test run system 101. The functions of the test controller 103 and its various functions may also be realized by software modules or a combination of hardware elements and software modules. The test controller 103 further include functions for load simulation configured for compensating virtual users and storing rule base, preferably pre-defined, for the compensation. The test controller 103 may additionally also include a reporting module 232. The test controller 103 is a general purpose computer system with which arrangements described below using FIGS. 3 to 5 can be advantageously implemented in accordance with the present invention. The processes of FIGS. 3 and 5 may be implemented as software, such as one or more application programs executable within the test controller 103. The instructions may be formed as one or more code modules, each capable of performing one or more particular/assigned tasks. The software may also be divided into separate modules, including a module and the corresponding code modules for managing a user interface or the inter-device interface used for such tasks as receiving user commands for load simulation set up, rule base etc., outputting processing outcome and/or reports. The software may be stored on a computer readable medium, including the storage devices described below. The software is loaded onto the test controller 103 from an external medium, for example a computer readable medium, and then executed by the test controller 103. An external medium containing such software or computer program recorded on it is typically referred to as a computer program product.

As illustrated in FIG. 2, the test controller 103 may have input devices such as a keyboard 202 and a mouse pointer device 203, and output devices including a display device 214. The following embodiments are described using a configuration where the load simulation and user compensation are performed by the same computer module but the virtual users are hosted by other computer modules accessible via a network, which in turn are connected to the system under test 102 over the network. The network may comprise a wired network, a wireless network or a combination thereof.

An external Modulator-Demodulator (Modem) transceiver device 216 may be used by the test controller 103 for communicating to and from a communications network via a connection 221. In one embodiment, the network may be a wide-area network (WAN), such as the Internet or a private WAN.

The test controller 103 typically includes at least one processor unit 205, and a memory unit 206 for example formed from semiconductor random access memory (RAM) and read only memory (ROM). The test controller 103 also includes a number of input/output (I/O) interfaces including a video interface 207 that couples to the video display 214, an I/O interface 213 for such devices like the keyboard 202 and mouse 203, and an interface 203 for the external modem 216. In some implementations, the modem 216 may be incorporated within the computer module 201, for example within the interface 208. The test controller 103 may have a local network interface 211 which, via a connection 223, permits coupling of the test controller 103 to a local computer network, known as a Local Area Network (LAN). The local network interface 211 may be used in addition or instead of the external modem 216 to realize connection with the computer modules hosting the virtual users 104. The interface 211 may be formed by an Ethernet™ circuit card, a wireless Bluetooth™ or an IEEE 802.11 wireless arrangement.

Storage devices 209 are provided and typically include a hard disk drive (HDD). Other devices such as a floppy disk drive, an optical disk drive and a magnetic tape drive (not illustrated) also may be used and fall within the scope of this invention. The components 205 to 213 of the test controller 103 typically communicate via an interconnected bus 204 and in a manner which results in a conventional mode of operation of the computer system known to those in the relevant art.

Typically, the application programs such as a load simulation module 230, a compensation module 231 and a reporting module 232, and data used by the application programs such as a history file 233 and a rule base tile 234 are resident in the storage device 209 and read and controlled in execution by the processor 205. Storage of intermediate product from the execution of such programs may be accomplished using the semiconductor memory 206, possibly in conjunction with the hard disk drive. In some instances, the application programs maybe supplied to the user encoded on one or more CD-ROM or other forms of computer readable media and read via a corresponding drive, or alternatively may be read by the user from a suitable drive via the network.

A part of the application programs and the corresponding code modules may be executed to implement one or more graphical user interfaces (GUIs) to be rendered or otherwise represented upon the display 214 or to implement other modes of input/output or storage control. Through manipulation of the keyboard 202 and the mouse 203, an operator of the test controller 103 and the application may manipulate the interface to provide controlling commands and/or input to the applications associated with the GUI(s).

Virtual User Compensation and Reporting Processes

Each of the software modules and data files used will be described in greater detail below.

The load simulation module 230 is responsible for converting the defined operational profile into actions to be performed by each virtual user, and controls the actions that need to be performed by each test agent 104-1 to 104-N and by each virtual user. When new virtual users are created by the compensation module 231, the load simulation module 230 communicates new actions to be performed by the new virtual users to the test agent 104-1 to 104-N that simulates these virtual users.

The compensation module 231 is also configured to monitor the status of each virtual user 104 during the test run based on the inputs from the load simulation module 230, and compensates for the terminated virtual user during the test run, as will be described in more detail later. When a virtual user termination is detected, the compensation module 231 refers to the rule base stored in the rule base file 234 and determines criteria for compensating for the terminated virtual user.

Figure 4A:
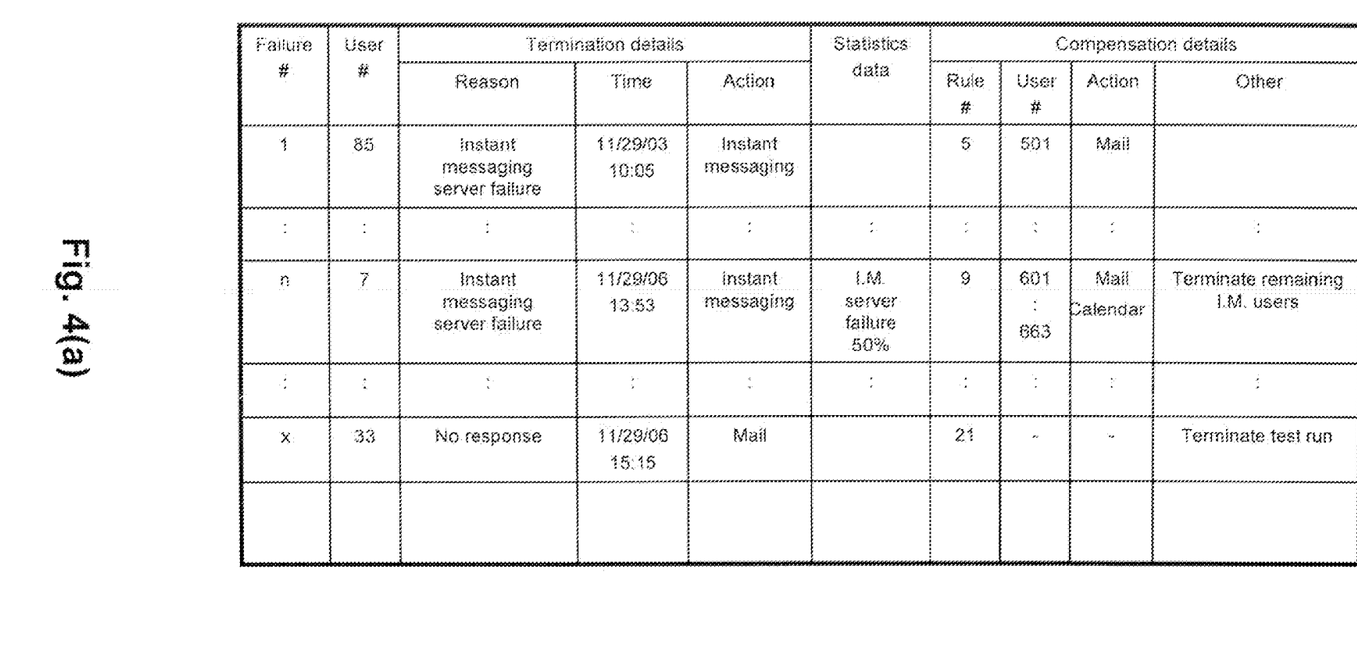
FIG. 4(a) is a schematic structure of a history file for virtual user terminations.

The details of the virtual user termination are recorded in a history file 233, as shown in FIG. 4(a). For example, the history file 233 stores information containing specifics of the virtual user failure, such as the reason of the virtual user failure, time of failure, the last action the user successfully performed, and the action the user was performing while if failed or the component which can be speculated to be the cause of the failure. For each compensation that is arranged or organized or prepared, the history file 233 maintains details of the compensation such as the mapping of every failed virtual user with the new added virtual user and the rule(s) applied to arrange or organize or prepare the compensation.

For the purpose of determining compensation policies depending on overall performance of the enterprise system or its components, the history file 233 may also include statistical data such as the number and/or percentage of virtual users terminated in connection with each component. The statistical data can be stored in correspondence with individual virtual user failures as shown in FIG. 4(a), or can be stored in a separate table FIG. 4(b) in which operational profile and failure number/percentages are recorded for each component and/or virtual user that is terminated.

The compensation module 231 refers to the details of the virtual user failures stored in the history file 233 to determine the appropriate compensation rule base that can he applied to the virtual user failure, and the result of such a determination is recorded in the history file 233. The history file 233 may also be referenced by the reporting module 232 to produce a summary report of the test run.

The rule base file 234 stores a set of rules that are used to govern or regulate the aspects of virtual user failure compensation and specifies the logic to decide conditions where (and where not) to compensate for the virtual users that are terminated. The set of rules can be defined by the test analyst and stored in the rule base file 234 before the test run is started, or, alternatively, they can be learned real-time during the test runs. For example, a rule can be such defined that whenever a threshold number of virtual users are terminated or where more than a threshold number of virtual users are terminated or proportion of virtual users are terminated, the virtual user compensation occurs for every terminated virtual user. The set of rules also defines that, in the event of the virtual user terminations for a particular component is above the defined threshold, the new virtual users are to be created to compensate for the terminated virtual users and are targeted to other components of the same application under test.

The reporting module 232 generates the reports of the test run. The reporting module obtains inputs from the history file 233 for preparing the reports. These reports can be output during runtime to understand the current status of the test run, or to understand the reason for failures, and identify the virtual user compensations being made during the test run. The frequency with which the reports are updated during runtime can be configured by the test analyst, depending on the level of monitoring required for the test run.

Figure 3:
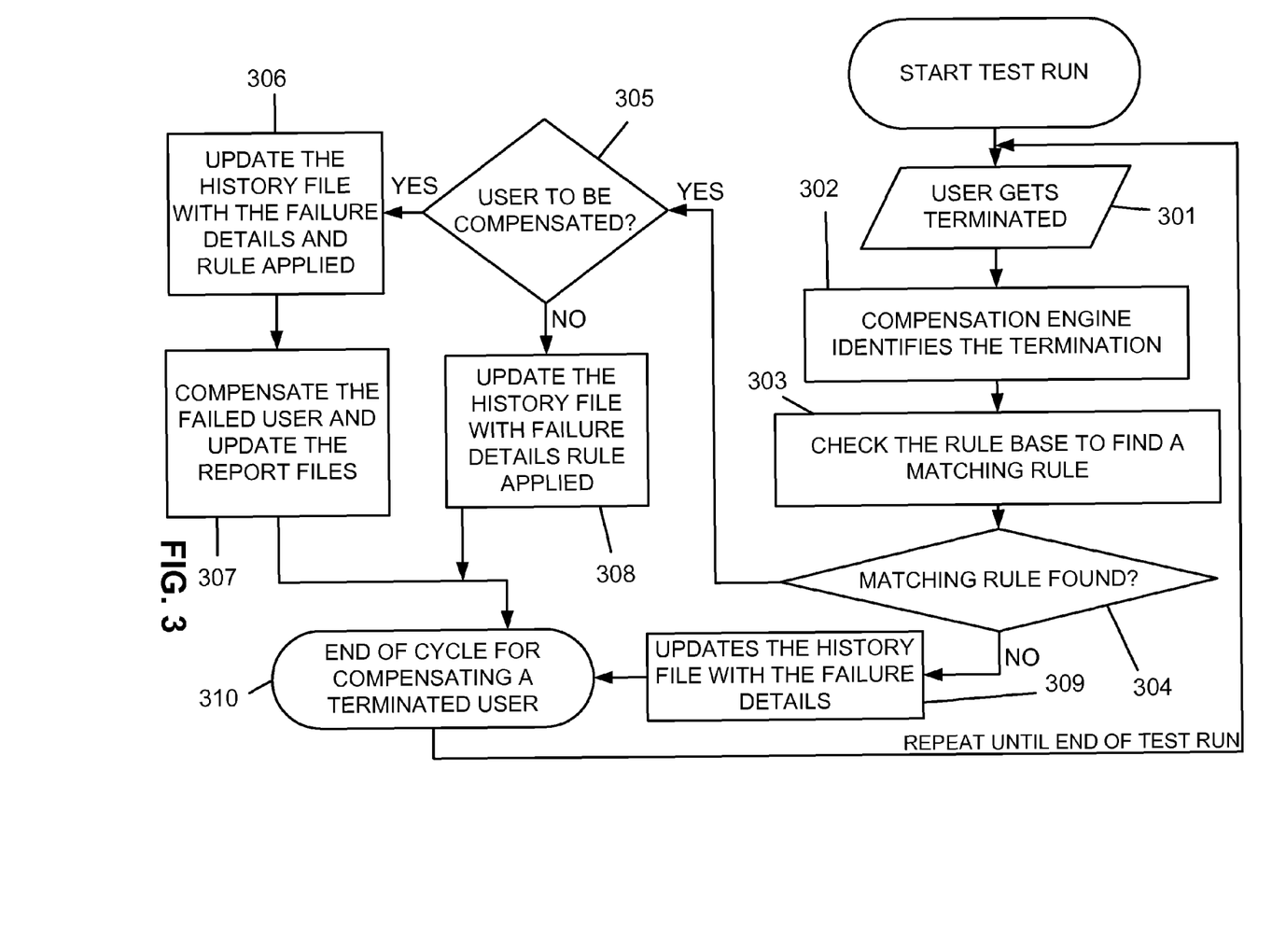
FIG. 3 is a flowchart showing virtual user compensation processing of the present invention.

The process followed by the compensation module 231 to compensate abruptly terminated virtual user 231 will now be described with reference to the flowchart shown in FIG. 3.

The user compensation process is triggered by the termination of a virtual user in step 301. In step 302, the compensation module identifies that virtual user termination has occurred and information regarding the particulars of the virtual user termination are collected. In step 303, the compensation module 231 refers to the rule base file 234 to check if there exist any rule(s)/set of rules that matches with the particulars of the virtual user termination that has been identified. Here, the compensation module 231 may also refer to the history file 233 to determine any matching rule(s) according to the record of past failures or virtual user terminations. If no matching rule is found (step 304) in the history file 323, the compensation module 231 updates the history file 233 with information related to the particulars of the virtual user termination in step 309. The compensation process regarding the virtual user termination is then completed, and the compensation module 231 returns waiting for the next trigger of a virtual user termination.

If a matching rule is found in step 304, then the compensation module 231 determines whether or not the terminated virtual user is to be compensated for according to the matching rule in step 305. If compensation of the terminated virtual user is not required, then, in step 308, the compensation module 231 updates the history file 233 with information related to the particulars of the virtual user termination and the rule that was applied to make the decision of non-compensation. The compensation process for the virtual user termination is then completed. In some cases, the entire test run may be terminated in step 308 if the matched rule specifies such procedure as will be described later.

If it is determined that the terminated virtual user is to be compensated for in step 305, then, in step 306, the compensation module 231 updates the history file 233 with information related to the particulars of the virtual user termination and the rule(s) applied to arrive at the decision for the compensation. In step 307, the compensation module 231 performs the compensation of the terminated virtual user according to the matching rule found in step 303. Information related to the particulars of the virtual user compensation, such as the circumstances under which the similar new virtual user was created, to target the same or other active component of the enterprise application under test for virtual user compensation, can also be recorded in the history file 233 in correspondence with the terminated virtual user. Steps 306 and 307 can be performed in a reverse order or performed together. The report tile for the test run also may be updated, in accordance to the steps 306 and 307. The updating of the report file may be performed in parallel with the operation of step 306 and/or 307, or any time after that.

To create virtual users for compensation in step 307, the compensation module 231 of the test controller 103 triggers a new execution thread specific to the context of a new virtual user. The test controller 103 defines the actions to be performed by the new virtual users and the component 108 to be targeted according to rules stored in the rule base file 234 and the operational profile. Other details such as request category, destination server etc., may remain the same for the compensated virtual users.

Following are some examples of the rule base used for the virtual user compensation determination.

a) In one embodiment, if a virtual user fails more than a defined threshold number of times or percentage due to the same failure reason in connection with a given component, then the subsequent compensation would be made a target to a different component and the component in which the failure had originally occurred will not be targeted, for subsequent virtual user compensations. The choice of the component for all subsequent virtual user compensations would be governed by the operational profile of the system. The threshold value can be configured by the test analyst.

Figure 4B:
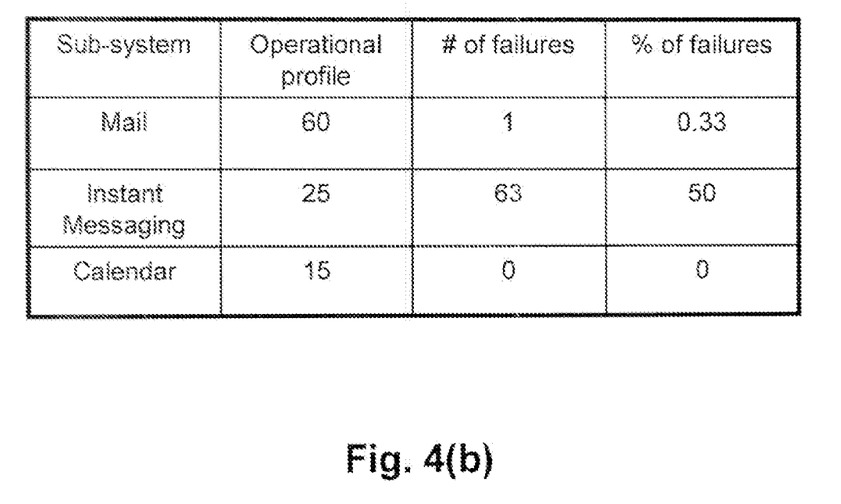
FIG. 4(b) is a schematic structure of a history file including statistics data.

For example, consider an enterprise system having application servers 108 such as a mail server, an instant messaging server and a calendar server as components. The operational profile of the enterprise system is mails ~60%, instant messaging ~25% and calendaring ~15%. An operational profile represents estimated or measured percentages of virtual users requesting processing by each of the components or the ratio of task processing resources consumed in the components by the user requests. If a virtual user fails in the instant messaging component five times, for example, due to the instant messaging component failure, then every subsequent termination of the virtual user in the instant messaging component will be compensated by adding a virtual user in the mails component, since it has the highest operational probability. The number of times virtual user failures have occurred can be found in the history rile 233, such as shown in FIG. 4(b). Adding a new virtual user for the component with the highest operational probability has the advantage of having a minimal impact on the operational profile as a result of the virtual user compensation.

b) In a further embodiment, if the virtual user terminations exceed a defined percentage or number of the initial targeted number of virtual users for the overall system, then the compensation module 231 advantageously terminates the test run For example, if the virtual user terminations exceed 50% of the initial number of virtual users the test run is terminated. The percentage value can be configurable and defined by the test analyst using the rule engine.

c) In a former embodiment, as discussed previously with respect to point (a), this invention accounts for the virtual users that are failing in the same component due to multiple different reasons. If the virtual user terminations exceed a defined percentage of the initially targeted number of virtual users for a particular component, all the subsequent virtual user failures would be compensated for targeting to other components. Further, all virtual users, that are presently active in the component where the percentage of failures has exceeded the threshold, will be terminated. A number of new virtual users equivalent to those forcibly terminated are created and distributed across other components as compensation to the enterprise system. The percentage value can be configurable and defined by the test analyst.

For example, consider an enterprise system having application servers 108 such as a mail server, an instant messaging server and a calendar server as three components. The operational profile of the system is mails ~60%, instant messaging ~25% and calendaring ~15%. If for example, 50% of the virtual users fail in the instant messaging component due to a major problem in the instant messaging component, then all the remaining active virtual users assigned to the instant messaging component will be re-allocated to the mails and/or the calendar components. The ratio of users distributed among these components can be determined by the operational profile ratio of these remaining components. The entry for a failure number 'n' in FIG. 4(a) is an example of the record in the history file 233 generated for this particular situation.

d) in a further embodiment the test run can be terminated if more than a defined threshold percentage of the total number of components or components with a defined threshold of added load proportion of the enterprise system fails or malfunctioning is determined. A weight can be assigned to each component for calculating the impact of its failure on the overall test run. For example, in a system having ten components, if five components fail which accounts for the total operational profile of greater than 0.5, then the test run would be terminated.

e) In a further embodiment, where a system or component is loaded by user requests, in some instances the user requests may not obtain a proper response from the server. For example, consider a situation where the HTTP code received from the web server is '200, OK' for a user requested event. However, the verification point in the script of the HTTP code tails because page contents is improperly loaded or loaded incompletely, typically in situations when only a partial page response is received at the client end (in case of the present invention, the computer system hosting a virtual user). In such situation where the load simulation module 230 determines that the virtual user is not provided with an appropriate response, the virtual user exits abruptly and reports the reason of such an abrupt termination to the test controller 130, and an appropriate rule can be defined to compensate for the virtual user terminated due to lack of appropriate response. In this case, the new virtual user created to compensate for the terminated user may be directed to the same or another component of the application under test. The action to be performed by the newly created user will be based on the operational profile of the targeted component.

f) In a further embodiment, the server may not respond to user requests. This occurs in situations where either of the components, the web server or the application server, is incapable of balancing the quantum of incoming requests with the quantum of the requests being processed per unit time. The request queue builds up and the clients (virtual users) which have a high response time initially, gradually deteriorates to timeouts and/or even server crashes. This would lead to terminating all the active virtual users rapidly within a short span of time. For example, as described previously with respect to FIG. 2, if the directory server 109, load balancer 105 or database server 110 crashes, then all active virtual users will terminate eventually. In such cases, a generic rule can be defined to terminate the entire test run.

g) In yet a further embodiment, where one or more test agents 104-1 to 104-N simulating virtual users have crashed due to reasons such as excessive user load distribution, insufficient system resources, power failure, or hardware malfunctioning, then all virtual users planned to be triggered from those test agents can be distributed uniformly over the remainder of the available test agents. The distribution can be made equally or proportionately to the user handling capacity of each test agent. The user handling capacity of each test agent can be defined and stored at the test controller 103 before starting the test run. The test agent failure can be detected by the load simulator upon reports sent from the computer system 104 hosting the virtual users, and the compensation module 231 can search for a matching rule(s) in the rule base file 234. When the failed test agent is identified, the compensation module 231 can then specify the test agent(s) to allocate the substitution virtual users to.

Reports of the test run generated by the reporting module 232 are beneficial for monitoring and analysing the status during the test run and also at the completion of the test run. The reporting module 232 obtains inputs from the history file 233 for generating log files. For run time availability of reports, the frequency with which the reports need to be updated can be configured at the start of the test run by the test analyst.

The generated report may contain the following:
a) Detail of each virtual user terminated along with the time stamp and the reason of termination.
b) Details of the new virtual users added to compensate for the terminated virtual users, along with the rule applied to make the compensation.
c) Details of all the terminated virtual users that have been compensated for, targeted to another component.
d) A summary section including:
   The total number of virtual users terminated
   The total number of virtual users added
   Average time taken to add new virtual users
   The maximum and minimum instances of user failures occurring due to a similar reason(s)
   The number of times each rule base have been applied. An advantage being in refining the rules for improved effect of virtual user compensation.
   Deviation between the planned/targeted TPS and the actual TPS of the test run.

The generated report contains information about the virtual user failures and details of the component for which the failed virtual users were initially targeted. Advantages being in assisting the test analyst to i) understand if terminating of the virtual users occurs due to any infrastructural issues, and
ii) identify the component that malfunctioned and the nature of malfunction; whether it was an inappropriate operational profiling for that component or problem with respect to component programming and/or component design, thereby assisting the test analyst to report important defects, which are otherwise not possible or feasible to report.

The report may also contain system availability information of the test run. The system availability report can be generated employing conventional method. Through the virtual user compensation of this invention, the total TPS on the enterprise system is sustained even If some virtual users are abnormally/abruptly terminated, for example due to the malfunction of a component of the enterprise system. As a result, even in such test runs where virtual user terminations occur, the system availability can be analysed under the intended total TPS, thereby assisting system developers to address issues of system availability during the early phase of the system development, even in parallel with flushing out problems associated with abnormal user terminations related to individual components.

The above embodiment assumes a configuration where the test controller 103 is a computer module separated from computer modules hosting virtual users. However, other hardware/software configurations can be employed to realize the effect of maintaining transaction load level by compensating terminated virtual users during test runs to obtain useful system availability measurements without departing from the scope of the present invention. One example of such alternative configurations is one where the test controller 103 includes the functions of the test agents that simulate virtual users.

While this invention has been particularly shown and described with references to example embodiments thereof, it will he understood by those skilled in the art that various changes in form and details may be made therein without departing from the scope of the invention encompassed by the appended claims.

What is claimed is:

1. A method for compensating virtual users for a test run system of an enterprise system, the method comprising:
   (a) identifying termination of a virtual user in the test run system;
   (b) creating a new virtual user to compensate for the terminated virtual user, including:
   determining a matching rule associated with the terminated of the virtual user, and creating the new virtual user for the enterprise system based on the matching rule; and
   (c) assigning a new virtual user to the enterprise system thereby compensating for the terminated virtual user,
   wherein the enterprise system comprises a plurality of components,
   each virtual user in the test run system is targeted to at least one of the plurality of components, and each of the new virtual user is targeted to at least one of the plurality of components, and
   wherein the matching rule determines policy for compensating the terminated virtual user targeted to a first component with the new virtual user targeted to a second component in a first condition, the second component being different from a first component.

2. The method of claim 1, further comprises monitoring status of the virtual user in the enterprise system to identify the termination of the virtual user.

3. The method of claim 1, wherein the virtual users are simulated by one or more computer modules coupled to the test run system and enterprise system.

4. The method of claim 1, wherein the matching rule comprises a set of predefined criteria for the first component.

5. The method of claim 1, further comprises:
   determining the second component being targeted by the new virtual user, in accordance with an operational profile indicating percentage of load distribution amongst the plurality of components.

6. The method of claim 4, wherein the matching rule indicates that the test run of the enterprise system is to be terminated in a second condition when a set of predetermined criteria are determined to be failing.

7. The method of claim 6, wherein the matching rule indicates that, in a third condition where a test agent corresponding to the terminated virtual user is determined to be failing, other virtual users associated with the test agent that is failing is to be distributed to other available test agents, further including determining a failure of a test agent.

8. The method of claim 1, further comprises generating a report of the test run wherein the report includes information about compensation of any virtual users abruptly terminated.

9. A test controller apparatus for virtual user compensation for a performance and reliability test run of an enterprise system, the apparatus comprising:
   a storage device for storing a plurality of rules for virtual user compensation specifying compensation policies corresponding to conditions of virtual user termination; and
   a processor for identifying the virtual user termination, and compensating the virtual user terminated with a new virtual user according to one of the plurality of rules stored in a rule base file in the storage device matching a condition of the virtual user termination;
   wherein the rule base file stored in the storage device includes a first rule indicating that a terminated virtual user targeted to a first component is to be compensated for with a new virtual user targeted to a second component, the second component being different from the first component, by the terminated virtual user in a first condition where more than a threshold number or percentage of terminations occurs in connection with the first component; and
   the processor is further configured to determine the condition of the virtual user termination referring to a history file recording termination detail information corresponding to virtual user terminations stored in the storage device.

10. The apparatus of claim 9, wherein the apparatus is connected to a plurality of computer modules for simulating virtual users performing actions by transmitting requests targeted to the enterprise system.

11. The apparatus of claim 9, wherein the enterprise system has a plurality of components.

12. The apparatus of claim 11, wherein each virtual user is targeted to at least one of the plurality of components, and the new virtual user is targeted to at least one of the plurality of components.

13. The apparatus of claim 11, wherein the processor is configured to further determine the second component to which the new virtual user is targeted to, in accordance with an operational profile indicating percentage of load distribution among the plurality of components.

14. The apparatus of claim 11, wherein
   the rule base file stored in the storage device includes a second rule indicating that the performance and reliability test run of the enterprise system is to be terminated in a second condition when more than a threshold number or percentage of virtual users are terminated or where more than a threshold number or proportion of components are determined to be failing.

15. The apparatus of claim 14, wherein
the rule base file stored in the storage device includes a third rule indicating that, in a third condition where a test agent corresponding to a terminated virtual user is determined to be failing, then other virtual users associated with the failing test agent is to be distributed to other test agents, and
the processor further configured to determine a failure of a test agent by referring to a log of the virtual user termination.

16. The apparatus of claim 9, wherein the processor is further configured for generating a report of the performance and reliability test run including information about virtual user compensation.

17. A computer program product having a computer readable medium having a computer program recorded therein capable of implementing a method for compensating virtual users for a test run system of an enterprise system, the computer program comprising:
computer program code means for identifying termination of a virtual user in the test run system;
computer program code means for creating a new virtual user to compensate for the terminated virtual user;
computer program code means for assigning the new virtual user to the enterprise system; and
computer program code means for determining a matching rule associated with termination events of the virtual users in the test run system and creating the new virtual user for the enterprise system based on the matching rule,
wherein the enterprise system includes a plurality of components,
each of the virtual users is targeted to at least one of the plurality of components, and the new virtual user is targeted to at least one of the plurality of components, and
the matching rule determines policy for compensating the terminated virtual user targeted to a first component with the new virtual user targeted to a second component in a first condition, the second component being different from a first component.

18. The computer program product of claim 17, further comprising computer program code means for monitoring status of the virtual user in the enterprise system to identify the termination of the virtual user.

19. The computer program product of claim 17, wherein the virtual users are simulated by one or more computer modules connected to the test run system and the enterprise system.

20. The computer program product of claim 17, further including
computer program code means for determining the second component to which the new virtual user is targeted to in accordance with an operational profile indicating percentage of load distribution among the plurality of components.

21. The computer program product of claim 17, wherein the matching rule indicates that the test run of the enterprise system is to be terminated in a second condition when more than a threshold number or percentage or number of virtual users are terminated or where more than a threshold number or proportion of components are determined to be failing.

22. The computer program product of claim 21, wherein the matching rule indicates that, in a third condition where a test agent corresponding to a terminated virtual user is determined to be failing, then other virtual users associated with the failing test agent is to be distributed to other test agents, further including determining a failure of a test agent.

23. The computer program product of claim 17, further including
computer program code means for generating a report of the test run including information about the virtual user compensation.

* * * * *